(12) United States Patent
Ganiger et al.

(10) Patent No.: US 11,821,371 B1
(45) Date of Patent: Nov. 21, 2023

(54) BOWED-ROTOR MITIGATION SYSTEM FOR A GAS TURBINE

(71) Applicant: General Electric Company, Schenectady, NY (US)

(72) Inventors: Ravindra Shankar Ganiger, Bengaluru (IN); Kudum Shinde, Bengaluru (IN); Surender Reddy Bhavanam, Bengaluru (IN); Weize Kang, Mason, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/816,018

(22) Filed: Jul. 29, 2022

(51) Int. Cl.
*F02C 7/32* (2006.01)
*F01D 25/34* (2006.01)
*F01D 5/02* (2006.01)

(52) U.S. Cl.
CPC ............. *F02C 7/32* (2013.01); *F01D 5/02* (2013.01); *F01D 25/34* (2013.01); *F05D 2220/32* (2013.01); *F05D 2240/20* (2013.01); *F05D 2260/941* (2013.01)

(58) Field of Classification Search
CPC ......... F01D 25/34; F02C 7/32; F05D 2260/42
See application file for complete search history.

(56) References Cited

U.S. PATENT DOCUMENTS

| 3,141,384 | A | 7/1964 | Hoffman |
| 9,664,070 | B1 | 5/2017 | Clauson et al. |
| 9,970,328 | B2 | 5/2018 | Haerms et al. |
| 10,508,601 | B2 | 12/2019 | Sheridan et al. |
| 10,760,498 | B2 | 9/2020 | Cannella et al. |
| 10,781,754 | B2 | 9/2020 | Chiasson et al. |
| 10,927,757 | B2 | 2/2021 | Stevenson |
| 2006/0230761 | A1 | 10/2006 | Robertson et al. |
| 2011/0232294 | A1* | 9/2011 | Ross ............ F02C 7/26 60/773 |
| 2017/0234232 | A1* | 8/2017 | Sheridan ....... F02C 7/275 307/9.1 |
| 2019/0203646 | A1* | 7/2019 | Cannella ........ F03G 1/00 |

FOREIGN PATENT DOCUMENTS

| DE | 1956178 A1 | 5/1971 |
| FR | 3127024 A1 | 3/2023 |
| FR | 3127025 A1 | 3/2023 |

\* cited by examiner

*Primary Examiner* — Scott J Walthour
(74) *Attorney, Agent, or Firm* — Venable LLP; Edward A. Kmett; Michele V. Frank (57) ABSTRACT

A gas turbine engine includes a compressor rotor shaft assembly, an accessory gearbox, and a bowed-rotor mitigation drive device drivingly coupled with the accessory gearbox. The bowed-rotor mitigation drive device is driven during an engine startup phase so as to induce a mechanical load (mechanical energy) to the bowed-rotor mitigation drive device. The mechanical load (mechanical energy) is retained within the bowed-rotor mitigation drive device during operation of the gas turbine engine. The mechanical load (mechanical energy) retained within the bowed-rotor mitigation drive device is periodically released by the bowed-rotor mitigation drive device in a plurality of periods so as to provide, in each period, a driving force to the accessory gearbox, which provides the driving force to the compressor rotor shaft assembly to periodically rotate the compressor rotor shaft assembly.

10 Claims, 11 Drawing Sheets

BOWED-ROTOR MITIGATION SYSTEM FOR A GAS TURBINE

TECHNICAL FIELD

The present disclosure relates to a bowed-rotor mitigation system for a gas turbine.

BACKGROUND

Conventionally, when a turbine engine is shut down, due to high temperatures within the core engine, heat stratifies in the engine core. In a compressor, and, more particular, within a high pressure compressor, an upper portion of the compressor rotors tend to become hotter than a lower portion of the compressor rotors due to rising heat within the compressor section, which leads to asymmetrical thermal expansion between the upper portion of the compressor rotors and the lower portion of the compressor rotors. This can lead to a bowed-rotor condition in which a bowed shaped rotor, when rotated, may contact a stator of the compressor and leads to rubbing of the bowed rotor against the stator. Furthermore, an unbalance induced by the bowed rotor shape will lead to dynamics deflections from the rotor rotation during the next engine startup. Repeated contact or rubbing with the stator during rotation of the compressor rotor with a bowed-rotor condition may cause damage to the engine.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first" or "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Conventionally, when a turbine engine is shut down, due to high temperatures within the core engine, heat stratifies in the engine core. In a compressor, and, more particularly, within a high pressure compressor, an upper portion of the compressor rotors at the upper side of the compressor tend to become hotter than the lower portion the compressor rotors at the lower side of the compressor due to rising heat within the compressor section. The stratification can often lead to a high temperature difference between the upper portion of the compressor rotors and the lower portion of the compressor rotors, which leads to asymmetrical thermal expansion between the upper portion of the compressor rotors and the lower portion of the compressor rotors. In this case, the upper portion of the compressor rotors thermally expand a greater axial and radial amount than the lower portion of the compressor rotors, causing what is referred to as a bowed-rotor condition. The bowed-rotor condition may occur within ten minutes of the engine being turned off and may last up to eight hours. This can lead to a bowed-rotor condition in which the bowed shaped rotor, when rotated, may contact a stator of the compressor and leads to rubbing against the stator. Furthermore, the unbalance induced by the bowed rotor shape will lead to dynamics deflections from the rotor rotation during the next engine startup. Repeated contact or rubbing with the stator during rotation of the compressor rotor during the next engine startup with a bowed-rotor condition may cause damage to the engine.

The present disclosure addresses the foregoing by providing a bowed-rotor mitigation drive device that provides a periodic release of a mechanical load (or mechanical energy) so as to rotate the compressor rotors. According to an aspect of the present disclosure, the bowed-rotor mitigation drive device may be drivingly coupled to a starter device, such as an air turbine starter, and may also be drivingly coupled with an accessory gearbox, that itself is drivingly coupled with a compressor rotor shaft assembly. During a startup phase of the gas turbine engine, the starter device is actuated to start turning the compressor rotor shaft assembly, and the actuation of the starter device energizes a mechanical load within the bowed-rotor mitigation drive device. As one example, the bowed-rotor mitigation drive device may include a spring-like device that is compressed or torqued by a shaft driven by the starter device so as to energize a mechanical load to store mechanical energy to the spring-like device, and the mechanical load (mechanical energy) may then be retained by a clutch device of the bowed-rotor mitigation drive device throughout normal operation of the gas turbine engine. Then, during an engine shutdown phase in which the normal operation of the gas turbine engine is terminated and the compressor rotor shaft assembly is no longer being driven by the operation of the gas turbine engine, the mechanical load (stored mechanical energy) within the bowed-rotor mitigation drive device is periodically released to rotate, via the accessory gearbox, the compressor rotor shaft assembly. For example, the clutch device may be actuated to partially unwind the torqued spring-like device such that the bowed-rotor mitigation drive device imparts a rotational drive force to the accessory gearbox, thereby causing the compressor rotor shaft assembly to rotate. The amount of rotation of the compressor rotor shaft assembly is based on the amount of mechanical load (mechanical energy) released by the bowed-rotor mitigation drive device. As an example, the amount of mechanical load (mechanical energy) released may be sufficient to rotate the compressor rotor shaft assembly one-half of a revolution. The periodic release of the mechanical energy provides for a periodic rotation of the compressor rotor shaft assembly so as to result in a more even cooling of the compressor rotors, thereby mitigating the bowed-rotor condition of the compressor rotor shaft assembly.

Figure 1:
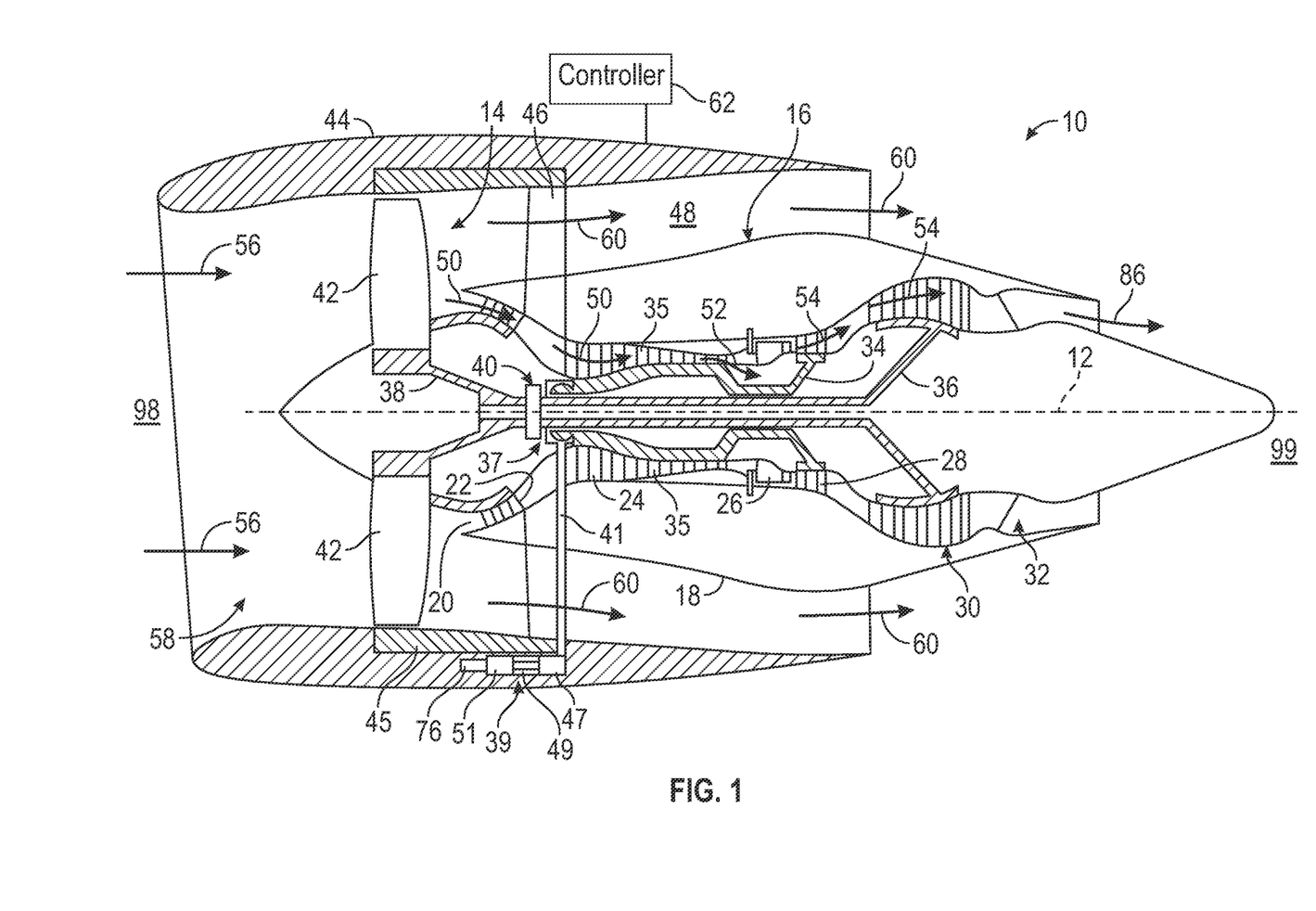
FIG. 1 is a schematic partial cross-sectional side view of an exemplary high by-pass turbofan jet engine, according to an aspect of the present disclosure.

Referring now to the drawings, FIG. 1 is a schematic partial cross-sectional side view of an exemplary high by-pass turbofan jet engine 10, herein referred to as "engine 10," as may incorporate various embodiments of the present disclosure. Although further described below with reference to a turbofan engine, the present disclosure is also applicable to turbomachinery in general, including turbojet, turboprop, and turboshaft gas turbine engines, including marine and industrial turbine engines and auxiliary power units. As shown in FIG. 1, engine 10 has a longitudinal centerline axis 12 that extends therethrough from an upstream end 98 of the engine 10 to a downstream end 99 of the engine 10 for reference purposes. In general, engine 10 may include a fan assembly 14 and a core engine 16 disposed downstream from the fan assembly 14.

The core engine 16 may generally include a core engine outer casing 18 that defines an annular inlet 20. The core engine outer casing 18 encases, in serial flow relationship, a compressor section (22/24) having a booster or a low pressure (LP) compressor 22 and a high pressure (HP) compressor 24, a combustor 26, a turbine section (28/30) including a high pressure (HP) turbine 28 and a low pressure (LP) turbine 30, and a jet exhaust nozzle section 32. A high pressure (HP) compressor rotor shaft assembly 34 drivingly connects the HP turbine 28 to the HP compressor 24. The HP compressor rotor shaft assembly 34 includes a plurality of compressor rotors 35 axially spaced apart from one another along the engine centerline axis 12. The HP compressor rotor shaft assembly 34 is also coupled to an internal gearbox (IGB) 37 that, as will be explained below, drives the HP compressor rotor shaft assembly 34 during an engine startup phase 200 (FIG. 15) and drives an accessory drive system 39 during normal operations of the engine 10. The accessory drive system 39 will be described in more detail below. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40, such as in an indirect-drive configuration or a geared-drive configuration. In other embodiments, although not illustrated, the engine 10 may further include an intermediate pressure (IP) compressor and a turbine rotatable with an intermediate pressure shaft.

As shown in FIG. 1, the fan assembly 14 includes a plurality of fan blades 42 that are coupled to, and extend radially outwardly from, the fan shaft 38. A nacelle 44 circumferentially surrounds the fan assembly 14 and/or at least a portion of the core engine 16 and the nacelle 44 may be connected to a fan casing 45 that may be supported relative to the core engine 16 by a plurality of circumferentially spaced outlet guide vanes or struts 46. Moreover, at least a portion of the nacelle 44 may extend over an outer portion of the core engine 16 so as to define a bypass airflow passage 48 therebetween.

In operation, air 56 enters the nacelle 44 at a nacelle inlet 58, and a portion of the air 56 enters the compressor section (22/24) as a compressor inlet air flow 50, where the air 56 is compressed to generate compressed air 52. Another portion of the air 56 enters the bypass airflow passage 48, thereby providing a bypass airflow 60. The compressed air 52 from the compressor section (22/24) enters the combustor 26, where the compressed air 52 is mixed with fuel that is then ignited and burned to generate combustion gases 54. The combustion gases 54 pass through the HP turbine 28 and then the LP turbine 30, thereby driving the HP compressor 24 and the LP compressor 22. Finally, the combustion gases 54 pass through the jet exhaust nozzle section 32 to provide thrust.

Operation of the engine 10 may be controlled in whole or in part by an electronic engine controller, shown schematically at 62. One example of such an engine controller 62 is a full authority digital engine control ("FADEC"). The engine controller 62 may be mounted in any convenient location or in the engine 10, including, but not limited to, within a fan nacelle, or within the core engine 16.

Figure 2:
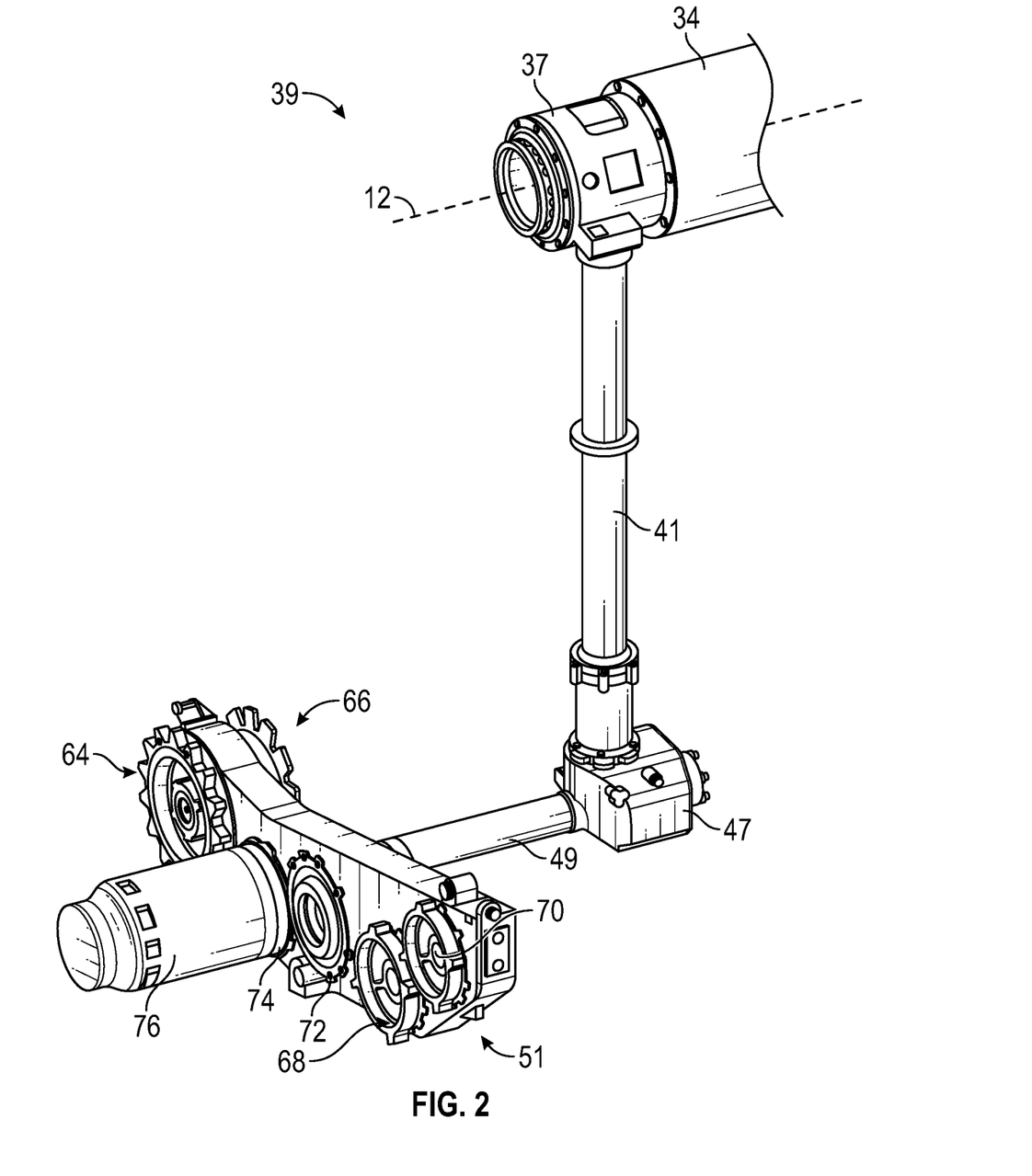
FIG. 2 is an elevational view of an exemplary accessory drive system according to an aspect of the present disclosure.
Figure 3:
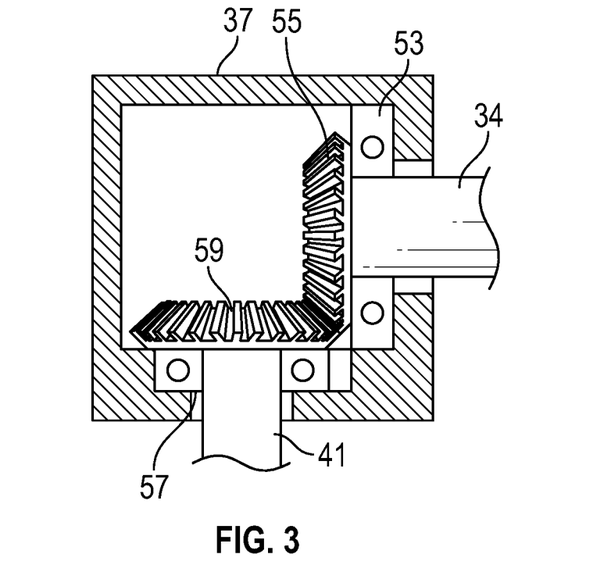
FIG. 3 is a schematic cross-sectional diagram of an exemplary internal gearbox, according to an aspect of the present disclosure.

FIG. 2 is an elevational view of an exemplary accessory drive system according to an aspect of the present disclosure. As shown in FIG. 2, the accessory drive system 39 includes the internal gearbox 37, which is coupled to the HP compressor rotor shaft assembly 34 and with a radial drive shaft 41. FIG. 3 is a schematic diagram depicting an example of the internal gearbox 37. As seen in FIG. 3, the internal gearbox 37 may support one or more bearings 53 that are coupled to, or engage with, a forward side of the HP compressor rotor shaft assembly 34, and a bevel gear 55 may also be connected to the forward side of the HP compressor rotor shaft assembly 34. The internal gearbox 37 may also support one or more bearings 57 that are coupled to, or that engage with, the radial drive shaft 41. A bevel gear 59 may also be connected to a radially inner end of the radial drive shaft 41, and the bevel gear 59 of the radial drive shaft 41 engages with the bevel gear 55 of the HP compressor rotor shaft assembly 34. In operation, during an engine startup phase 200 and/or during an engine shutdown phase 201 as will be described below, the radial drive shaft 41 is driven by an accessory gearbox 51 (described below), which drives the HP compressor rotor shaft assembly 34 to rotate the HP compressor rotor shaft assembly 34.

Returning to FIG. 2, the radial drive shaft 41 may be connected to a transfer gearbox 47, which may contain a similar arrangement of bearings and bevel gears as shown in FIG. 3, but for the radial drive shaft 41 being engaged by and driven by a transfer drive shaft 49. The transfer gearbox 47 may be attached to the fan casing 45 (FIG. 1). The transfer drive shaft 49 is coupled to an accessory gearbox (AGB) 51, which may be attached to the fan casing 45 (FIG. 1). During the engine startup phase 200 and during the engine shutdown phase 201 (FIG. 15), the transfer drive shaft 49 may be driven by the accessory gearbox 51, thereby driving the radial drive shaft 41, which in turn rotates the HP compressor rotor shaft assembly 34. The accessory gearbox 51 may include various mounting pads 64, 66, 68, 70, and 72 for mounting various accessories to the accessory gearbox 51. Some example accessories that may be mounted to the various mounting pads 64, 66, 68, 70, and 72 may include an oil pump unit (OPU), a hydraulic pump, a deoiler, a permanent magnetic alternator (PMA), an electric drive generator (EDG), and a fuel pump unit (FPU). In addition, as shown in FIG. 2, a starter device 76 may be mounted to a starter mounting pad 74 of the accessory gearbox 51.

Figure 4:
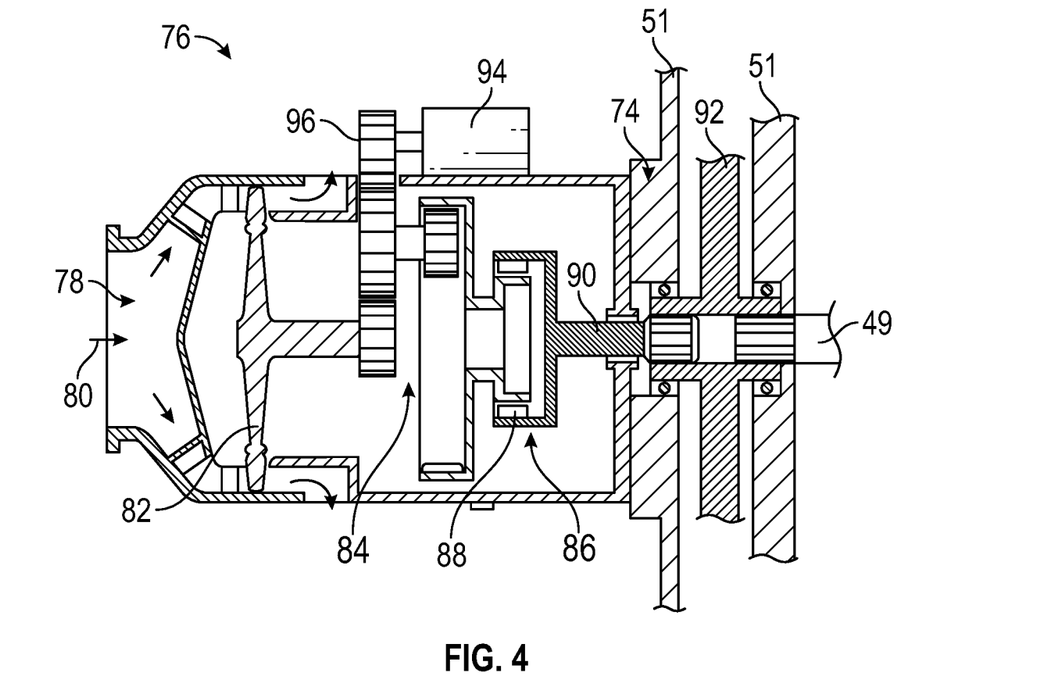
FIG. 4 is a partial cross-sectional view of an exemplary starter device, according to an aspect of the present disclosure.

FIG. 4 is a partial cross-sectional view of an exemplary starter device, according to an aspect of the present disclosure. In FIG. 4, the starter device 76 is depicted as being an air turbine starter (ATS) that is mounted to the accessory gearbox 51 at the starter mounting pad 74. However, other types of starter devices may be implemented instead of an air turbine starter, including electric starters, and the following description is merely one example of a starter device. As for the air turbine starter, the starter device 76 may include an inlet 78 that, during an engine startup operation, may be connected with an air drive source (not shown) that forces an airflow 80 into the inlet 78. The airflow 80 causes a turbine rotor shaft 82 to rotate. The turbine rotor shaft 82 is engaged with a gear assembly 84, and the gear assembly 84 engages with a clutch device 86. The clutch device 86 includes a plurality of sprags 88 and a clutch device output shaft 90. During the startup operation, the sprags 88 engage so that, as the turbine rotor shaft 82 rotates due to the forced airflow 80, the clutch device output shaft 90 rotates. The clutch device output shaft 90 is engaged with an accessory gear 92 within the accessory gearbox 51 and causes the accessory gear 92 to rotate. As shown in FIG. 4, the transfer drive shaft 49 may also be engaged with the accessory gear 92 so as to drive the transfer drive shaft 49, which in turns drives the radial drive shaft 41 and then the HP compressor rotor shaft assembly 34. Once the engine startup has been successful, the HP compressor rotor shaft assembly 34 drives the accessory gearbox 51 via the internal gearbox 37, the radial drive shaft 41, the transfer gearbox 47, and the transfer drive shaft 49. The starter device 76 may be taken offline once the engine startup has been successfully completed, and the sprags 88 in the clutch device 86 disengage from the clutch device output shaft 90.

As also shown in FIG. 4, a bowed-rotor mitigation drive device 94 may be coupled with the starter device 76. In the aspect of FIG. 4, the bowed-rotor mitigation drive device 94 is shown to include a gear 96 that may be engaged with the gear assembly 84 of the starter device 76. While FIG. 4 depicts an aspect in which the bowed-rotor mitigation drive device 94 is external to the starter device 76, and includes the gear 96 engaged with the gear assembly 84 of the starter device 76, further aspects of the present disclosure as discussed below may include an aspect in which the bowed-rotor mitigation drive device 94 is integrated within the starter device 76. Another aspect may include the gear 96 engaging with the clutch device output shaft 90. Yet another aspect may include the bowed-rotor mitigation drive device 94 being mounted to the accessory gearbox 51 and the gear 96 engaging with the accessory gear 92 within the accessory gearbox 51. The bowed-rotor mitigation drive device 94 will be discussed in more detail below, but briefly, during the engine startup phase 200, the gear assembly 84 may rotate the gear 96 so as to energize a mechanical load within the bowed-rotor mitigation drive device 94. Then, during the engine shutdown phase 201, the bowed-rotor mitigation drive device 94 may periodically release the stored mechanical load (stored mechanical energy) to cause the gear 96 to rotate. The rotation of the gear 96 in turn causes the gear assembly 84 to rotate, which causes each of the clutch device output shaft 90, the accessory gear 92, the transfer drive shaft 49, the radial drive shaft 41 (FIG. 1), and the HP compressor rotor shaft assembly 34 (FIG. 1) to rotate. The amount of the mechanical load (or the amount of mechanical energy) periodically released by the bowed-rotor mitigation drive device 94 in any given period may generally result in a rotation amount of the HP compressor rotor shaft assembly 34 that is less than one full rotation of the HP compressor rotor shaft assembly 34, and, in one aspect, may result in a one-half of one full revolution of the HP compressor rotor shaft assembly 34. The periodic rotation of the HP compressor rotor shaft assembly 34 during the engine shutdown phase 201 may mitigate a bowed-rotor condition by providing a more even cooling of the compressor rotors 35 (FIG. 1).

Figure 5:
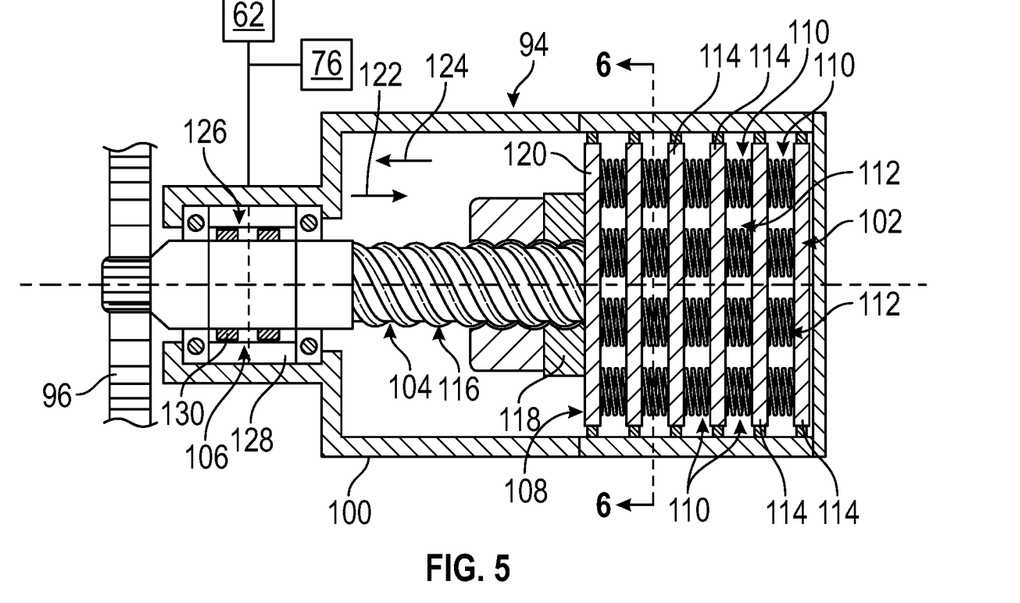
FIG. 5 is a partial cross-sectional view of an exemplary bowed-rotor mitigation drive device, according to an aspect of the present disclosure.

FIG. 5 is a partial cross-sectional view of an exemplary bowed-rotor mitigation drive device 94, according to an aspect of the present disclosure. The FIG. 5 aspect of the bowed-rotor mitigation drive device 94 is seen to include a housing 100, a load mechanism 102, a shaft 104, and a load retention-release device 106. The load mechanism 102 may be a spring device 108 that may include a plurality of first spring structures 110 and a plurality of second spring structures 112 that are separated by baffle plates 114.

Figure 6:
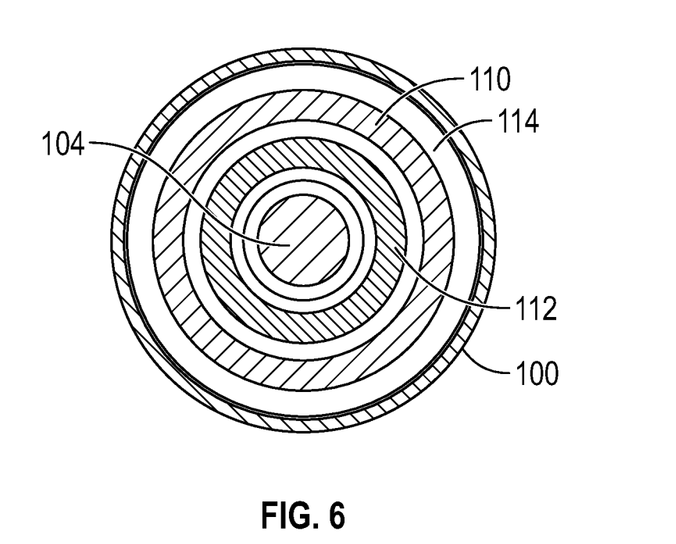
FIG. 6 is a cross-sectional view taken at plane 6-6 of FIG. 5 depicting an example of the first spring structure and a second spring structure, according to an aspect of the present disclosure.
Figure 7:
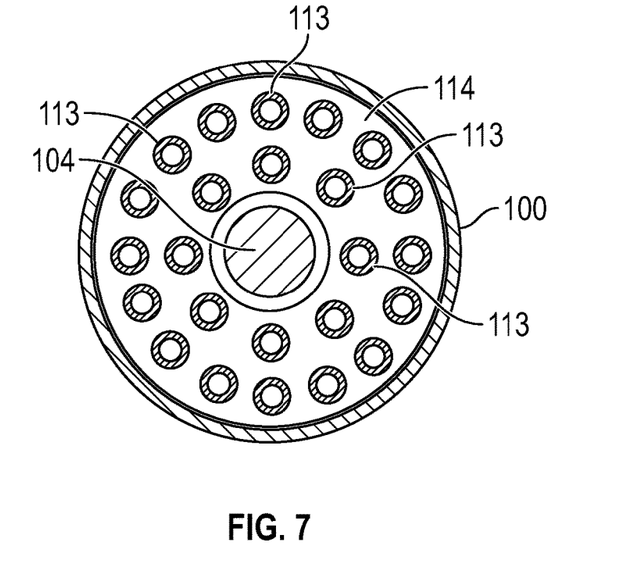
FIG. 7 is an alternate cross-sectional view similar to that of FIG. 6, according to an aspect of the present disclosure.

FIG. 6 is a cross-sectional view taken at plane 6-6 of FIG. 5 depicting an example of the first spring structure 110 and the second spring structure 112. As shown in FIG. 6, the first spring structure 110 and the second spring structure 112 may both comprise stacked waveform springs that are arranged circumferentially about the shaft 104, and that are retained between respective baffle plates 114. Of course, other types of springs besides waveform springs could be implemented instead, including helical springs. For example, FIG. 7 is an alternate cross-sectional view similar to that of FIG. 6, and depicts a plurality of helical springs 113 that may be arranged between the baffle plates 114.

Referring again to FIG. 5, the shaft 104 is shown to include a helical threaded shaft portion 116, and a threaded collar 118. The threaded collar 118 may threadedly engage with the helical threaded shaft portion 116 of the shaft 104. The helical threaded shaft portion 116 may be considered as a jackscrew. The threaded collar 118 engages, or may be bonded to or formed integral with, an end baffle plate 120. When the shaft 104 is driven by the gear 96 to rotate, the threaded collar 118 translates a first direction 122 to compress the first spring structures 110 and the second spring structures 112, thereby loading (or energizing) the load mechanism 102. The load retention-release device 106 may be a clutch device 126, which may include, for example, a sprag clutch and/or a plate clutch mechanism that may be electronically controlled by the engine controller 62. For example, during the engine startup phase 200, when the gear 96 is driven by the starter device 76, the clutch device 126 may provide for driving of the shaft 104 so as to compress (i.e., to energize) the load mechanism 102, and once the load mechanism 102 has been fully loaded (i.e., fully energized), the clutch device 126 may provide for disconnecting the shaft 104 from being driven by the gear 96, while, at the same time, retaining the load (mechanical energy) within the load mechanism 102. For instance, a sprag clutch portion 128 may retain the load (mechanical energy), while an electronically controlled plate clutch 130 may be operated to engage/disengage the shaft 104 from being driven by the gear 96.

On the other hand, during the engine shutdown phase 201, for mitigating the bowed rotor condition, a portion of the load (mechanical energy) within the load mechanism 102 is periodically released. That is, once the engine is stopped and the HP compressor rotor shaft assembly 34 is to be periodically rotated to mitigate the bowed rotor condition, the load (mechanical energy) within the load mechanism 102 is periodically released by the clutch device 126. The periodic release may be controlled by the engine controller 62 based on any of various conditions, including measured periodic time intervals, or engine temperature measurements during the engine shutdown phase 201. The clutch device 126 may be controlled so as to release a portion of the load (mechanical energy) by engaging the shaft 104 with the gear 96, and by temporarily releasing and then reengaging the sprag clutch portion 128. When the sprag clutch portion 128 is temporarily released, the first spring structures 110 and the second spring structures 112 provide a force to release the compression in the spring structures, which translates the threaded collar 118 in a second direction 124, thereby causing the shaft 104 to rotate temporarily. The temporary rotation of the shaft 104 causes the gear 96 to rotate, which in turn causes the HP compressor rotor shaft assembly 34 to temporarily rotate via the gear assembly 84 and the clutch device output shaft 90, and through the accessory drive system 39. The amount of the load (mechanical energy) released from the load mechanism 102 is arranged so that, through the drive system connecting the bowed-rotor mitigation drive device 94 and the HP compressor rotor shaft assembly 34, the HP compressor rotor shaft assembly 34 is caused to rotate less than one full revolution, and, in one aspect, is caused to rotate about one-half of one revolution. As a result, the upper portion of the compressor rotors 35 that may be subject to higher heat during the engine shutdown phase 201 can be rotated to provide a more even cooling of the compressor rotors 35.

Figure 8:
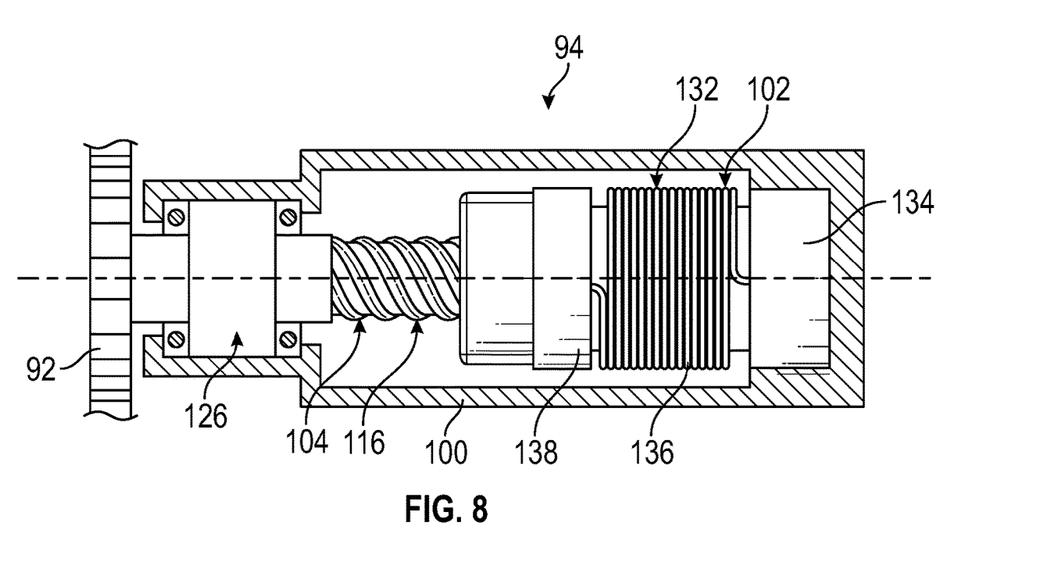
FIG. 8 is a partial cross-sectional view of a bowed-rotor mitigation drive device, according to another aspect of the present disclosure.

FIG. 8 is a partial cross-sectional view of a bowed-rotor mitigation drive device 94 according to another aspect of the present disclosure. The bowed-rotor mitigation drive device 94 is somewhat similar to the FIG. 5 aspect, but includes a somewhat different load mechanism 102. The load mechanism 102 of FIG. 8 is seen to include a spring device 132 that includes at least one spring 136 that is connected with an end cap 134 and a threaded collar 138, which may be similar to the threaded collar 118 (FIG. 5). The spring 136 may comprise at least one compression spring that, similar to FIG. 5, is compressed by rotation of the shaft 104 having the helical threaded shaft portion 116 to translate the threaded collar 138. The clutch device 126 may function in a same manner as that shown in FIG. 5 to retain the compressed load of the spring 136, and to release the compressed load of the spring 136. The release of the compressed load of the spring 136 during the engine shutdown phase 201 causes the threaded collar 138 to translate, thereby rotating the shaft 104, which in turn rotates the HP compressor rotor shaft assembly 34 to rotate so as to mitigate the bowed-rotor condition.

Alternatively, the spring 136 may be a torsion spring and the threaded collar 138 may be fixed to the shaft 104 so as to rotate with the shaft 104, while the end cap 134 is fixed to the housing 100 so as to not rotate. In this aspect, the rotation of the shaft 104 induces a torsional load to the spring 136, with the torsional load being retained by the clutch device 126. The clutch device 126 may be controlled so as to periodically release the torsional load in the spring 136. The periodic release of the torsional load (mechanical energy) during the engine shutdown phase 201 causes the shaft 104 to rotate, thereby causing the HP compressor rotor shaft assembly 34 to rotate in a similar manner as that described above for the FIG. 5 aspect.

Figure 9:
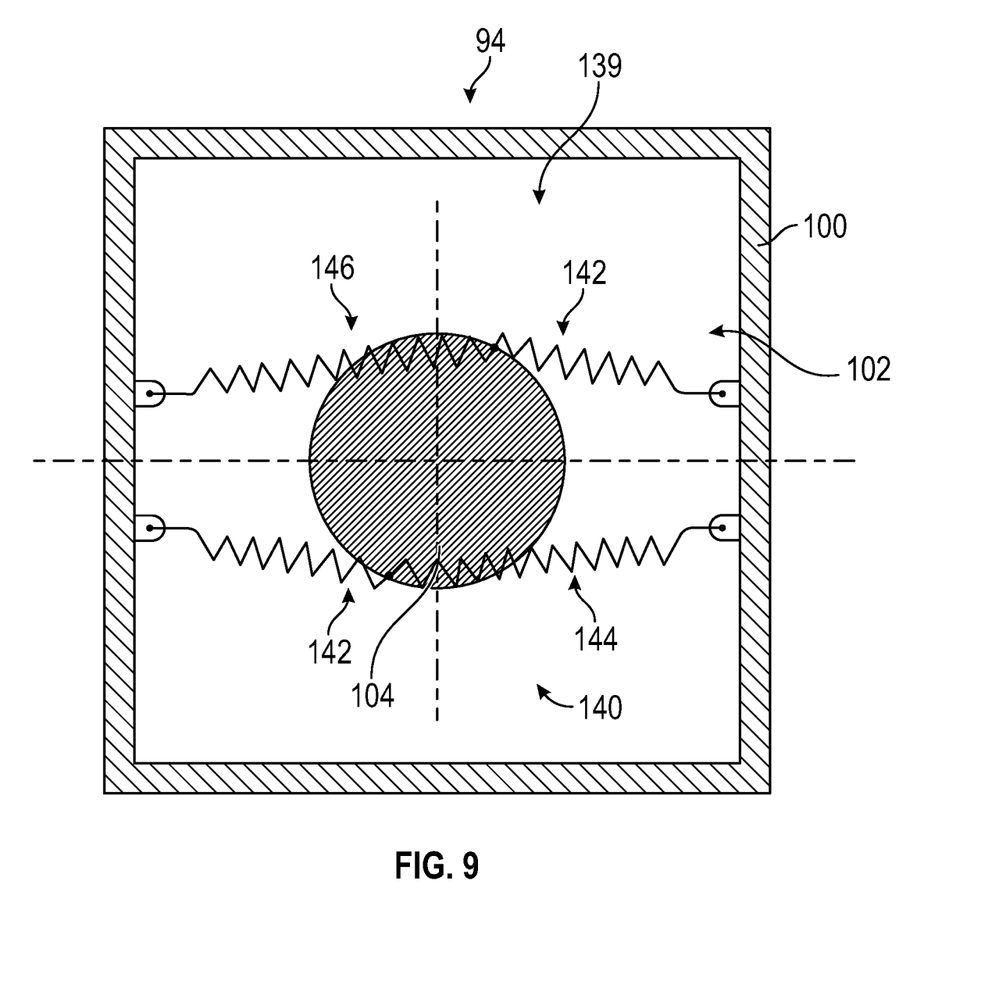
FIG. 9 depicts a cross-sectional view as an example of an alternate spring structure for a bowed-rotor mitigation drive device, according to another aspect of the present disclosure.

FIG. 9 depicts a cross-sectional view as an example of an alternate spring structure for a bowed-rotor mitigation drive device 94, according to another aspect of the present disclosure. The arrangement shown in FIG. 9 may be implemented within, for example, the bowed-rotor mitigation drive device 94 of FIG. 8 in place of the spring device 132. In the FIG. 9 aspect, a shape memory alloy (SMA) actuator 139 is implemented as the load mechanism 102. The SMA actuator 139 is arranged as a spring device 140 and is seen to include bias springs 142 connected to the shaft 104 and connected to the housing 100. The bias springs 142 may be metal alloy springs and are not made of an SMA material. The spring device 140 also includes shape metal alloy (SMA) material device (e.g., SMA springs), including a first SMA spring 144 and a second SMA spring 146, each of which is connected to the shaft 104 and is connected to the housing 100. Each of the first SMA spring 144 and the second SMA spring 146 may change their shape (i.e., shape-shift) by, for example, expanding in length (a first shape-shift) or contracting in length (a second shape-shift) based on a temperature from engine heat. For example, when the temperature is higher, the first SMA spring 144 and the second SMA spring 146 may contract to a shorter length (the second shape-shift), and, as the temperature is gradually lowered, the first SMA spring 144 and the second SMA spring 146 may gradually extend (the first shape-shift). The changing length (shape-shifting) of the first SMA spring 144 and the second SMA spring 146 provides a load for periodically rotating the shaft 104, which, in turn, results in a periodic rotation of the HP compressor rotor shaft assembly 34. While FIG. 9 depicts the spring device 140 as constituting the SMA actuator 139, the present disclosure is not limited to the SMA actuator 139 shown in FIG. 9 and other types of SMA actuators may be implemented instead.

Figure 10:
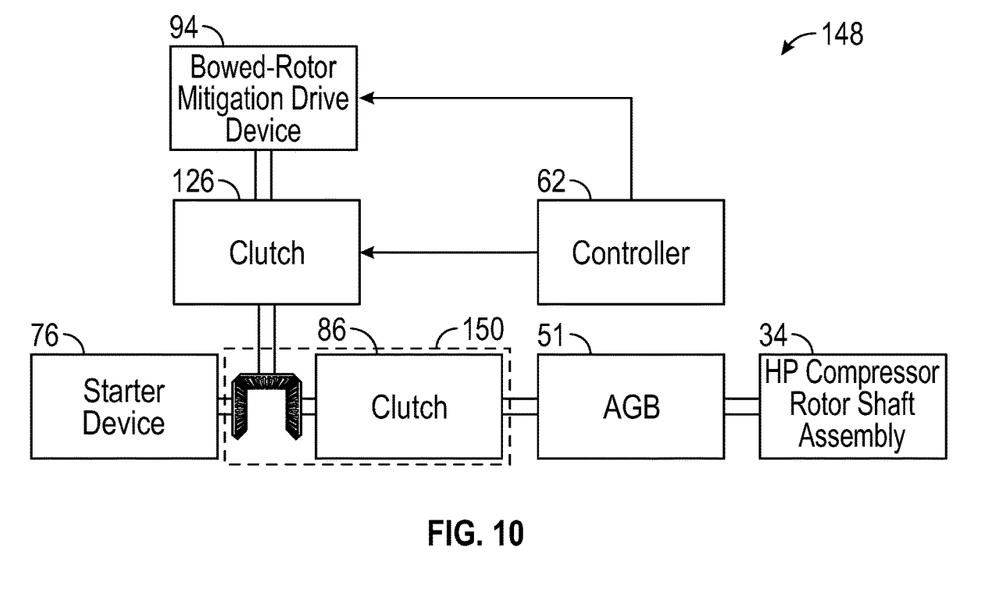
FIG. 10 is a schematic diagram of a system for mitigating a bowed-rotor condition, according to an aspect of the present disclosure.

FIG. 10 is a schematic diagram of a system for mitigating a bowed-rotor condition, according to an aspect of the present disclosure. As seen in FIG. 10, a bowed-rotor mitigation system 148 may include the starter device 76, the bowed-rotor mitigation drive device 94, the accessory gearbox 51, the HP compressor rotor shaft assembly 34, and the engine controller 62. FIG. 10 also depicts a gearbox 150 coupling the starter device 76, the bowed-rotor mitigation drive device 94, and the accessory gearbox 51. The gearbox 150 may correspond to, for example, the configuration of FIG. 4 of the gear assembly 84 within the starter device 76, the gear 96, and the clutch device output shaft 90. In the FIG. 10 aspect, the bowed-rotor mitigation drive device 94 may correspond to any of the aspects depicted in FIGS. 5 to 8. Thus, in operation of the bowed-rotor mitigation system 148 of FIG. 10, during the engine startup phase 200, the starter device 76 energizes (or loads) the bowed-rotor mitigation drive device 94 and drives the HP compressor rotor shaft assembly 34 to start the engine 10. Once the engine 10 has been started, the clutch device 86 within the gearbox 150 may disengage the starter device 76 and the bowed-rotor mitigation drive device 94 from being driven by the accessory gearbox 51. Then, in the engine shutdown phase 201, when the HP compressor rotor shaft assembly 34 has spun-down and has stopped turning, at periodic intervals determined by the engine controller 62, the bowed-rotor mitigation drive device 94 is actuated to periodically release a portion of the load so as to partially rotate the HP compressor rotor shaft assembly 34 (e.g., rotate the HP compressor rotor shaft assembly 34 one-half revolution). As a result, the bowed-rotor condition that may otherwise occur in the HP compressor rotor shaft assembly 34 can be mitigated.

Figure 11:
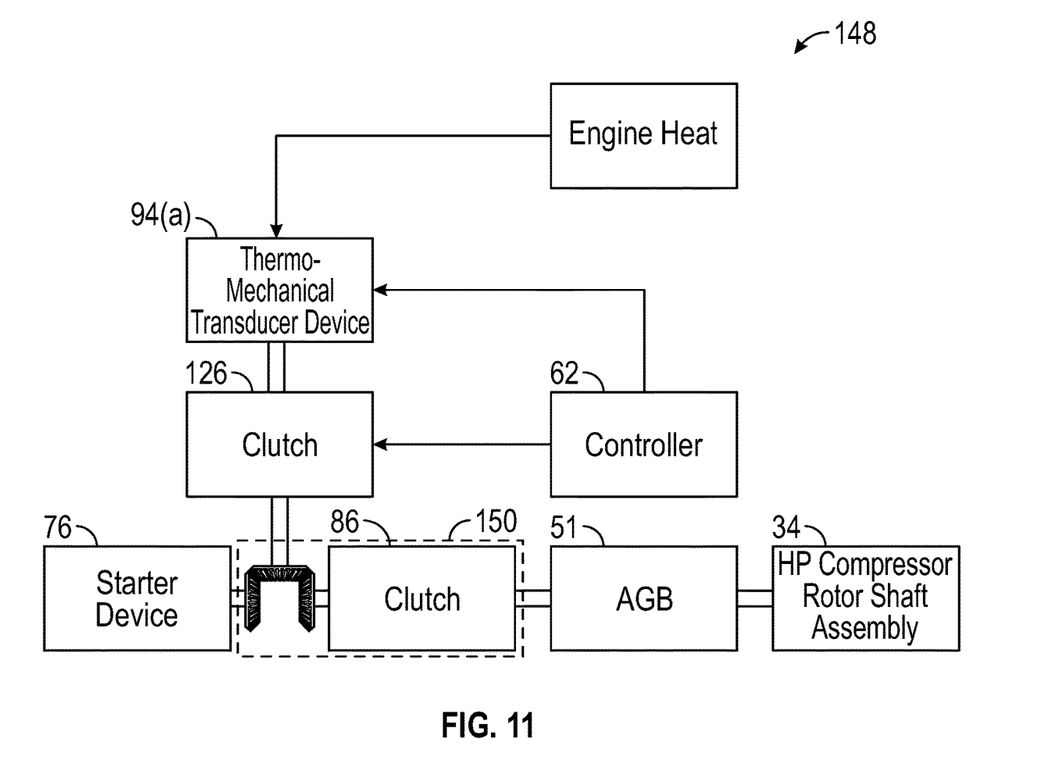
FIG. 11 is a schematic diagram of a system for mitigating a bowed-rotor condition, according to another aspect of the present disclosure.

FIG. 11 is a schematic diagram of a system for mitigating a bowed-rotor condition, according to another aspect of the present disclosure. The FIG. 11 aspect is similar to the FIG. 10 aspect, with one difference being that the bowed-rotor mitigation drive device 94 may be a thermo-mechanical transducer device 94(a), such as the SMA actuator 139 of FIG. 9 that includes the SMA material device, such as the first SMA spring 144 and the second SMA spring 146. Thus, engine heat induces a change in the shape of the first SMA spring 144 and the second SMA spring 146 to drive the thermo-mechanical transducer device 94(a). The engine controller 62 controls the release of the load (mechanical energy) within the bowed-rotor mitigation drive device 94 so as to partially rotate the HP compressor rotor shaft assembly 34.

Figure 12:
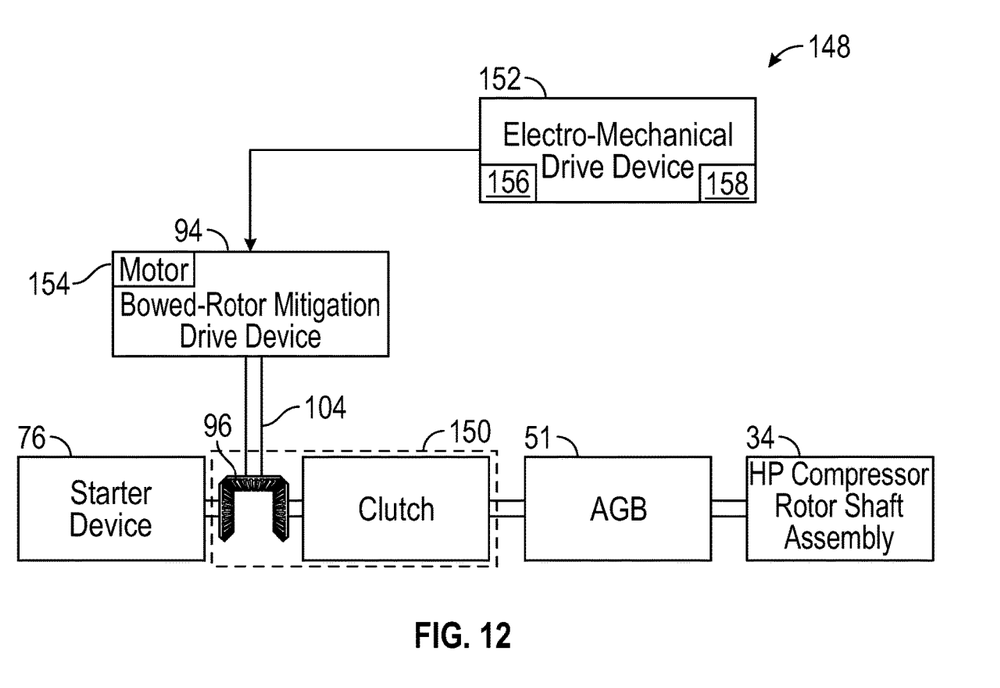
FIG. 12 is a schematic diagram of a system for mitigating a bowed-rotor condition, according to another aspect of the present disclosure.

FIG. 12 is a schematic diagram of a system for mitigating a bowed-rotor condition, according to another aspect of the present disclosure. The FIG. 12 aspect is similar to the FIG. 10 aspect, with one difference being that the bowed-rotor mitigation drive device may include an electro-mechanical drive device 152. In this aspect, the bowed-rotor mitigation drive device 94 includes an electric motor 154 coupled to the shaft 104 without the clutch device 126, and the electro-mechanical drive device 152 includes an associated power source, such as an electric storage device 156 that stores electric energy, and firmware 158 controlling the electric storage device 156. The electric motor 154 and/or the electric storage device 156 in combination with the electric motor 154, may be operated by the firmware 158 so that, in the engine shutdown phase 201, the electric storage device 156 periodically releases electrical power to drive the electric motor 154. The electric motor 154 thereby drives the accessory gearbox 51, and, in turn, rotates the HP compressor rotor shaft assembly 34 to mitigate the bowed-rotor condition.

Figure 13:
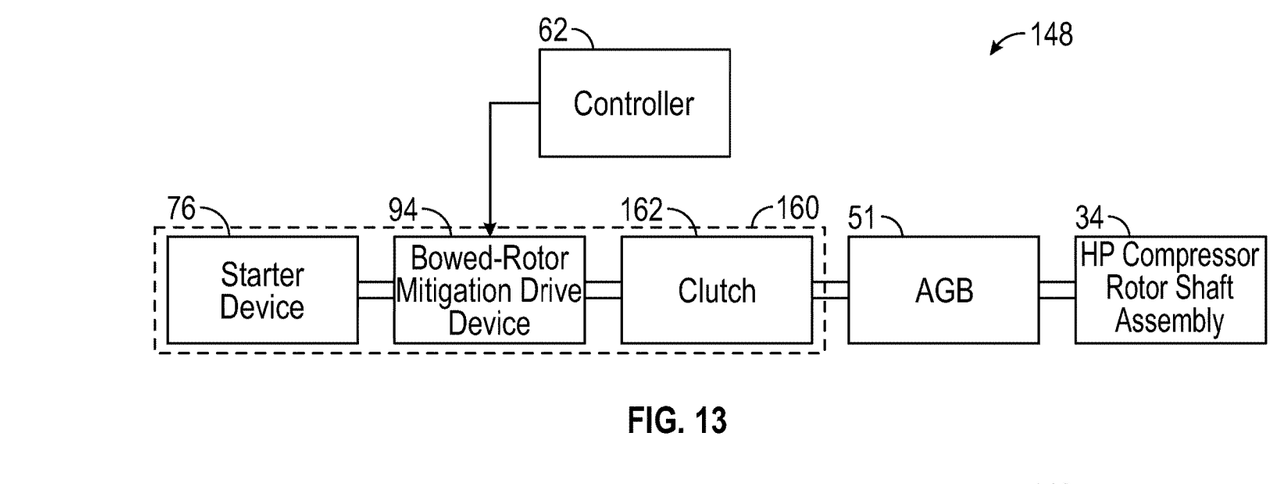
FIG. 13 is a schematic diagram of a system for mitigating a bowed-rotor condition, according to another aspect of the present disclosure.

FIG. 13 is a schematic diagram of a system for mitigating a bowed-rotor condition, according to another aspect of the present disclosure. In the foregoing aspects of FIGS. 10 to 12, the bowed-rotor mitigation drive device 94 is provided in parallel with the starter device 76. FIG. 13, however, depicts a configuration in which the bowed-rotor mitigation drive device 94 may be arranged in series with the starter device 76, and may be incorporated into a combined starter/bowed-rotor mitigation drive device 160. Thus, the starter device 76 may be directly coupled to the bowed-rotor mitigation drive device 94, which is arranged between the starter device 76 and the accessory gearbox 51, and a clutch 162 may be provided to engage/disengage the combined starter/bowed-rotor mitigation drive device 160 with the accessory gearbox 51. The engine controller 62 controls, during the engine shutdown phase 201, the bowed-rotor mitigation drive device 94 to periodically release the load so as to partially rotate the HP compressor rotor shaft assembly 34 to mitigate the bowed rotor condition.

Figure 14:
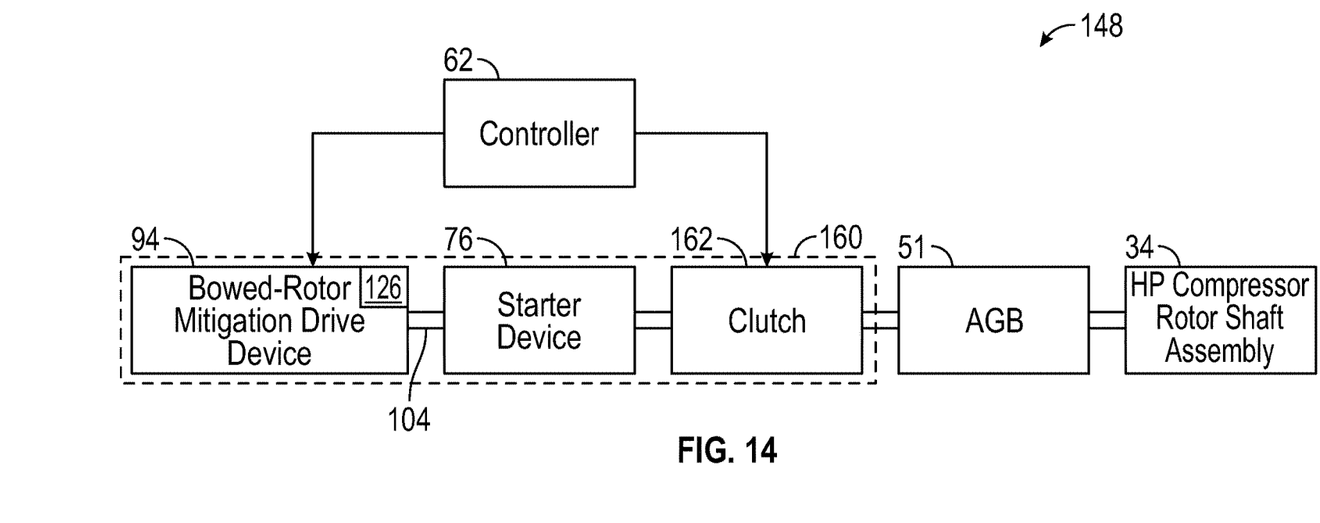
FIG. 14 is a schematic diagram of a system for mitigating a bowed-rotor condition, according to another aspect of the present disclosure.

FIG. 14 is a schematic diagram of a system for mitigating a bowed-rotor condition, according to another aspect of the present disclosure. The arrangement of FIG. 14 is similar to that of FIG. 13 in that the starter device 76 and the bowed-rotor mitigation drive device 94 are depicted as being arranged in series. In contrast to the FIG. 13 arrangement, in FIG. 14, the bowed-rotor mitigation drive device 94 may be arranged on an inlet side of the starter device 76, with the shaft 104 (FIG. 5) being directly coupled with the turbine rotor shaft 82 (FIG. 4) of the starter device 76. The bowed-rotor mitigation drive device 94 may include the clutch device 126 to engage/disengage the bowed-rotor mitigation drive device 94 and the starter device 76. During the engine shutdown phase 201, the engine controller 62 controls the bowed-rotor mitigation drive device 94 and the clutch device 126, and may also control the clutch device 162, to periodically release the load, thereby causing the turbine rotor shaft 82 to turn, which in turn drives the HP compressor rotor shaft assembly 34 via the accessory gearbox 51 so as to mitigate the bowed rotor condition.

Figure 15:
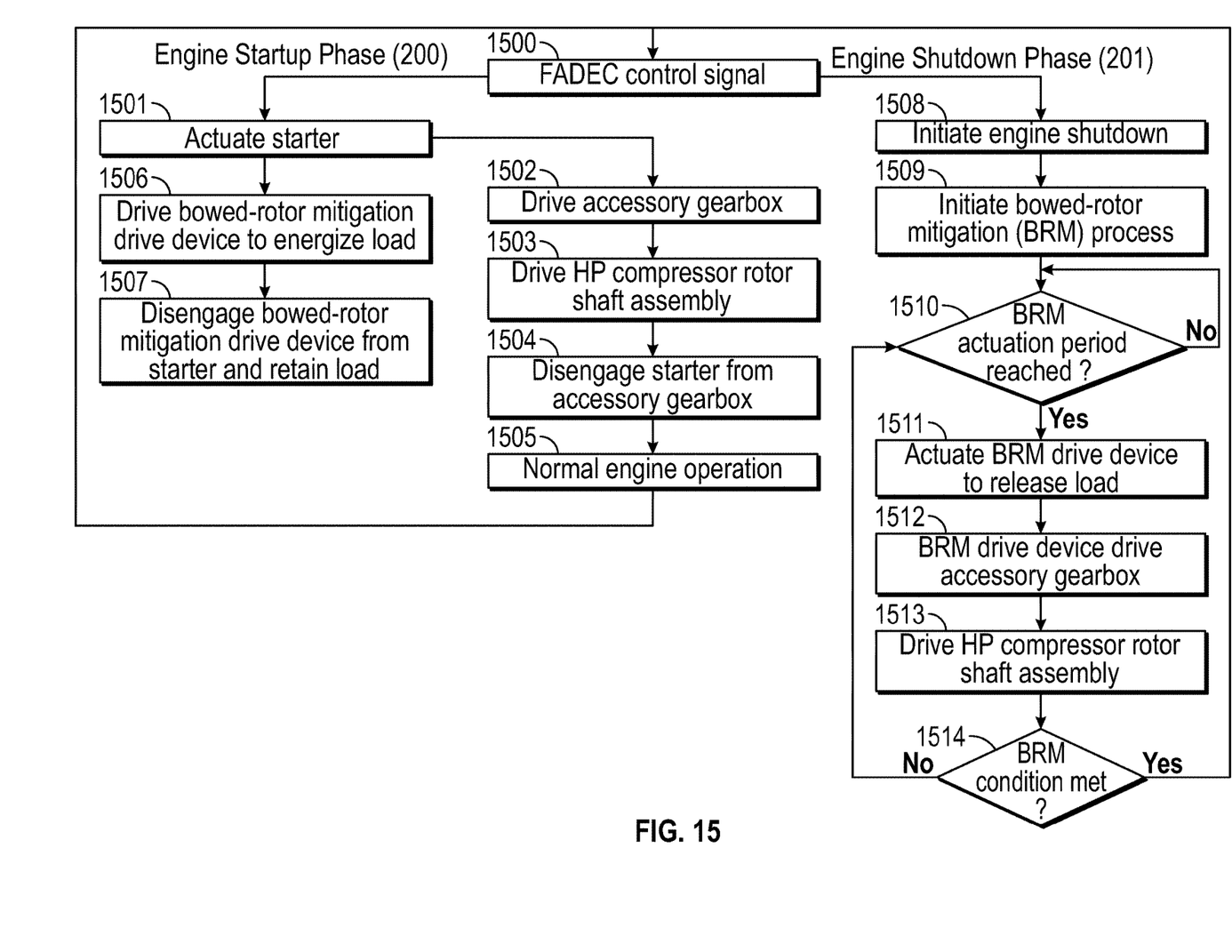
FIG. 15 is a flowchart of process steps for a method of mitigating a bowed-rotor condition, according to an aspect of the present disclosure.

FIG. 15 is a flow chart of process steps for a method of mitigating a bowed-rotor condition in a gas turbine engine. The method may be implemented in the gas turbine engine 10 including the compressor section 22/24 having the HP compressor rotor shaft assembly 34, the accessory gearbox 51 drivingly coupled with the HP compressor rotor shaft assembly 34, the starter device 76 drivingly connected with the accessory gearbox 51, and the bowed-rotor mitigation drive device 94 drivingly coupled with the starter device 76, and drivingly coupled with the accessory gearbox 51, according to any of the foregoing aspects described above for FIGS. 1 to 14. The method may be controlled by the engine controller (FADEC) 62. In step 1500, the engine controller 62 sends control commands to the engine 10 for the engine startup phase 200, and, in step 1501, the starter device 76 is actuated to start the engine 10. In step 1502, the starter device 76 drives the accessory gearbox 51, which in turn, in step 1503, drives the HP compressor rotor shaft assembly 34. Simultaneously, in step 1506, the starter device 76 drives the bowed-rotor mitigation drive device 94 to energize the load mechanism 102 therewithin. Once the load mechanism 102 has been energized (loaded), in step 1507, the bowed-rotor mitigation drive device 94 may be disengaged from the starter device 76 (e.g., via the plate clutch 130 of FIG. 4), and the load is retained within the bowed-rotor mitigation drive device 94 by, for example, engagement of the sprag clutch portion 128 (FIG. 4) of the clutch device 126. Once the HP compressor rotor shaft assembly 34 has reached a critical startup speed to startup the engine 10, in step 1504, the starter device 76 may be disengaged from the accessory gearbox via, for example, the clutch device 86 within the starter device 76 (FIG. 4). Thereafter, normal engine operations continue in step 1505 and flow returns to step 1500 for the engine controller 62 to control the normal engine operations.

Following the normal engine operations, an engine shutdown phase 201 may be initiated by the engine controller 62 sending control commands to the engine 10 to initiate the engine shutdown (step 1508). During the engine shutdown process, a bowed-rotor mitigation process may be initiated in step 1509. The bowed-rotor mitigation process may be initiated, for example, by detecting that the HP compressor rotor shaft assembly 34 has stopped rotating, at which time, a bowed-rotor condition may likely begin to occur if a bowed-rotor mitigation process is not performed. In the bowed-rotor mitigation process, a determination may be made in step 1510 by monitoring various conditions of the engine 10 to determine if a bowed-rotor actuation period has been reached. For example, once the HP compressor rotor shaft assembly 34 stops rotating, a timer may be initiated to set a bowed-rotor mitigation period for actuating the bowed-rotor mitigation drive device 94. As another example, a temperature reading may be taken at the upper side and at the lower side of the HP compressor 24, and a determination may be made if the temperature difference between the upper side of the HP compressor 24 and the lower side of the HP compressor 24 reaches a threshold value for which the compressor rotors 35 should be rotated to mitigate the bowed rotor condition. If the actuation period has not been reached (No, in step 1510), then the engine controller 62 continues to monitor the conditions. On the other hand, if a determination is made that the bowed-rotor actuation period has been reached (Yes, in step 1510), then, in step 1511, the engine controller 62 actuates the bowed-rotor mitigation drive device 94 to release a partial amount of the energized load from the load mechanism 102 (FIG. 4). For example, as was described above, the engine controller 62 may control the clutch device 126 (FIG. 4) to actuate to release a portion of the load contained within the load mechanism 102 so that the shaft 104 rotates, which drives the accessory drive system 39 in step 1512, and, in step 1513, the HP compressor rotor shaft assembly 34 rotates. As was described above, the amount of the load released is determined so as to partially rotate the HP compressor rotor shaft assembly 34 (e.g., to rotate one-half of one revolution). In step 1514, the engine controller 62 monitors the bowed-rotor mitigation conditions (e.g., a set time period, or a set temperature) of the engine and/or of the HP compressor rotor shaft assembly 34 to determine if a condition has been met in which a bowed-rotor condition is no longer likely to occur. If the condition has not been met, then the flow returns to step 1510 to continue the periodic actuation of the bowed-rotor mitigation drive device 94. If the bowed-rotor mitigation condition has been met, then the bowed-rotor mitigation process ends and the flow returns to the engine controller 62 to await further instructions.

With the foregoing aspects, the present disclosure provides a bowed-rotor mitigation system and a related method so as to periodically rotate the high pressure compressor rotor assembly by releasing stored mechanical energy in a bowed-rotor mitigation drive device connected with the accessory gearbox. By providing the periodic rotation of the compressor rotor shaft assembly after engine shutdown, a bowed-rotor condition can be mitigated since one side (upper side) of the compressor rotor shaft is not subjected to the heat stratification in the engine core.

While the foregoing description relates generally to a gas turbine engine, the gas turbine engine may be implemented in various environments. For example, the engine may be implemented in an aircraft, but may also be implemented in non-aircraft applications, such as power generating stations, marine applications, or oil and gas production applications. Thus, the present disclosure is not limited to use in aircraft.

Further aspects of the present disclosure are provided by the subject matter of the following clauses.

A gas turbine engine including a compressor section including a compressor rotor shaft assembly, an accessory gearbox drivingly coupled with the compressor rotor shaft assembly, and a bowed-rotor mitigation drive device drivingly coupled with the accessory gearbox, wherein the bowed-rotor mitigation drive device is driven during an engine startup phase to induce a mechanical load to the bowed-rotor mitigation drive device, the mechanical load being retained within the bowed-rotor mitigation drive device during operation of the gas turbine engine, and during an engine shutdown phase, the mechanical load is periodically released by the bowed-rotor mitigation drive device in a plurality of periods so as to provide, in each period, a driving force to the accessory gearbox to periodically rotate the compressor rotor shaft assembly.

The gas turbine engine according to the preceding clause, wherein the bowed-rotor mitigation drive device is driven during the engine startup phase by a starter device drivingly coupled with the bowed-rotor mitigation drive device and drivingly coupled with the accessory gearbox.

The gas turbine engine according to any preceding clause, wherein an amount of the mechanical load released by the bowed-rotor mitigation drive device provides the driving force to the accessory gearbox to rotate the compressor rotor shaft assembly less than one full revolution in each period.

The gas turbine engine according to any preceding clause, wherein the bowed-rotor mitigation drive device includes a load mechanism, a shaft, and a load retention-release device.

The gas turbine engine according to any preceding clause, wherein the load mechanism is a spring device, and the load retention-release device is a clutch device.

The gas turbine engine according to any preceding clause, wherein the spring device includes a series of stacked spring structures, the shaft includes a helical threaded portion, and the load retention-release device further includes a threaded collar that is actuated axially along the helical threaded portion so as to compress, during the engine startup phase, the series of stacked spring structures, and during the engine shutdown phase, release compression of the series of stacked spring structures.

The gas turbine engine according to any preceding clause, wherein the series of stacked spring structures includes a plurality of baffle plates and at least one compression spring arranged between respective ones of the plurality of baffle plates.

The gas turbine engine according to any preceding clause, wherein the at least one compression spring includes a plurality of compression springs arranged between respective ones of the plurality of baffle plates.

The gas turbine engine according to any preceding clause, wherein the at least one compression spring comprises at least one waveform spring.

The gas turbine engine according to any preceding clause, wherein the at least one compression spring comprises at least one helical spring.

The gas turbine engine according to any preceding clause, wherein the spring device includes a torsion spring, and during the engine startup phase, the torsion spring is loaded and during the engine shutdown phase, the torsion spring rotates the shaft.

The gas turbine engine according to any preceding clause, wherein, during the engine startup phase, a starter device drives the shaft to load the spring device, and during the engine shutdown phase, the clutch device periodically releases the load in the spring device so as to rotate the shaft.

The gas turbine engine according to any preceding clause, wherein a controller controls the clutch device to periodically release the load.

The gas turbine engine according to any preceding clause, wherein the load mechanism is a thermo-mechanical transducer device, and the load retention-release device is a clutch device.

The gas turbine engine according to any preceding clause, wherein thermo-mechanical transducer device comprises a shape memory alloy (SMA) material, the mechanical load comprises a first shape-shift of the SMA material during the engine startup phase, and the mechanical load is released by a second shape-shift of the SMA material, the clutch device periodically releasing the mechanical load.

The gas turbine engine according to any preceding clause, wherein the load mechanism is a spring device, and the load retention-release device is an electro-mechanical device.

The gas turbine engine according to any preceding clause, wherein the electro-mechanical device comprises an electric motor and an associated power source, and the mechanical load is released by firmware periodically operating the electric motor.

The gas turbine engine according to any preceding clause, wherein the bowed-rotor mitigation drive device is arranged in series with the starter device.

The gas turbine engine according to any preceding clause, wherein the bowed-rotor mitigation drive device is incorporated into a combined starter/bowed-rotor mitigation drive device.

The gas turbine engine according to any preceding clause, wherein the bowed-rotor mitigation drive device is arranged on an inlet side of the starter device, with the shaft being directly coupled with the starter device, and the bowed-rotor mitigation drive device includes the clutch device to engage/disengage the bowed-rotor mitigation drive device and the starter device.

A method of mitigating a bowed-rotor condition in a gas turbine engine, the gas turbine engine including (a) a compressor section including a compressor rotor shaft assembly, (b) an accessory gearbox drivingly coupled with the compressor rotor shaft assembly, (c) a starter device drivingly connected with the accessory gearbox, and (d) a bowed-rotor mitigation drive device drivingly coupled with the starter device, and drivingly coupled with the accessory gearbox, the method including initiating an engine startup phase of the gas turbine engine, actuating the starter device to provide a startup driving force to the accessory gearbox and to provide a driving force to the bowed-rotor mitigation drive device to energize a mechanical load within the bowed-rotor mitigation drive device, the mechanical load being retained within the bowed-rotor mitigation drive device, operating the gas turbine engine through at least one engine operating mode, initiating an engine shutdown phase of the gas turbine engine, and during the engine shutdown phase, periodically releasing, by the bowed-rotor mitigation drive device, in a plurality of periods, the mechanical load or mechanical energy retained within the bowed-rotor mitigation drive device so as to provide, in each period, a driving force to the accessory gearbox so as to periodically rotate the compressor rotor shaft assembly.

The method according to the preceding clause, wherein an amount of the mechanical load or mechanical energy released by the bowed-rotor mitigation drive device provides the driving force to the accessory gearbox to rotate the compressor rotor shaft assembly less than one full revolution in each period.

The method according to any preceding clause, wherein the bowed-rotor mitigation drive device includes a load mechanism, a shaft, and a load retention-release device.

The method according to any preceding clause, wherein the load mechanism is a thermo-mechanical transducer device comprising a shape memory alloy (SMA) material, and energizing of the mechanical load comprises a first shape-shift of the SMA material during the engine startup phase, and releasing of the mechanical load comprises a second shape-shift of the SMA material and the load retention-release device periodically releasing the mechanical load.

The method according to any preceding clause, wherein the load mechanism is a spring device, the load retention-release device is an electro-mechanical device comprising an electric motor and an associated power source, and the mechanical load is released by firmware periodically operating the electric motor.

The method according to any preceding clause, wherein the load mechanism is a spring device, and the load retention-release device is a clutch device.

The method according to any preceding clause, wherein, during the engine startup phase, the starter device drives the shaft to load the spring device, and, during the engine shutdown phase, the clutch device periodically releases the load in the spring device so as to rotate the shaft.

The method according to any preceding clause, wherein the spring device includes a series of stacked springs, the shaft is a jackscrew, and the load retention-release device further includes a slider device actuated axially along the jackscrew so as to compress, during the engine startup phase, the series of stacked springs, and, during the engine shutdown phase, release compression of the series of stacked springs.

Although the foregoing description is directed to some exemplary embodiments of the present disclosure, other variations and modifications will be apparent to those skilled in the art, and may be made without departing from the spirit or the scope of the disclosure. Moreover, features described in connection with one embodiment of the present disclosure may be used in conjunction with other embodiments, even if not explicitly stated above.

We claim:

1. A method of mitigating a bowed-rotor condition in a gas turbine engine, the gas turbine engine including (a) a compressor section including a compressor rotor shaft assembly, (b) an accessory gearbox drivingly coupled with the compressor rotor shaft assembly, (c) a starter drivingly connected with the accessory gearbox, and (d) a bowed-rotor mitigation drive device drivingly coupled with the starter, the bowed-rotor mitigation drive device comprising a series of stacked spring structures, a shaft having a helical threaded portion, a threaded collar engaged with the shaft, and a clutch, the method comprising:

initiating an engine startup phase of the gas turbine engine;

actuating the starter to provide a startup driving force to the accessory gearbox and to provide a driving force to the bowed-rotor mitigation drive device to drive the shaft and axially actuate the threaded collar along the helical threaded portion of the shaft to compress the series of stacked spring structures so as to induce a mechanical load within the bowed-rotor mitigation drive device, the mechanical load being retained within the bowed-rotor mitigation drive device by the clutch during operation of the gas turbine engine;

operating the gas turbine engine through at least one engine operating mode;

initiating an engine shutdown phase of the gas turbine engine; and during the engine shutdown phase, periodically releasing, by the clutch, the mechanical load in a plurality of periods so as to provide, in each period, a driving force to the shaft to drive the starter and to drive the accessory gearbox so as to periodically rotate the compressor rotor shaft assembly.

2. The method according to claim 1, wherein an amount of the mechanical load released by the bowed-rotor mitigation drive device provides the driving force to the starter and to the accessory gearbox to rotate the compressor rotor shaft assembly less than one full revolution in each period.

3. A gas turbine engine comprising:

a compressor section including a compressor rotor shaft assembly;

an accessory gearbox drivingly coupled with the compressor rotor shaft assembly;

a starter drivingly coupled to the accessory gearbox; and a bowed-rotor mitigation drive device drivingly coupled with the starter, the bowed-rotor mitigation drive device comprising (a) a series of stacked spring structures, (b) a shaft having a helical threaded portion, (c) a threaded collar engaged with the shaft, and (d) a clutch, wherein the bowed-rotor mitigation drive device is driven by the starter during an engine startup phase to drive the shaft and axially actuate the threaded collar along the helical threaded portion of the shaft to compress the series of stacked spring structures so as to induce a mechanical load within the bowed-rotor mitigation drive device, the mechanical load being retained within the bowed-rotor mitigation drive device by the clutch during operation of the gas turbine engine, and during an engine shutdown phase, the mechanical load is periodically released by the clutch in a plurality of periods so as to provide, in each period, a driving force to the shaft to drive the starter and to drive the accessory gearbox so as to periodically rotate the compressor rotor shaft assembly.

4. The gas turbine engine according to claim 3, wherein the starter includes a turbine rotor shaft and a gear assembly engaged with the turbine rotor shaft, the shaft of the bowed-rotor mitigation device includes a gear connected thereto that engages with the gear assembly, is driven during the engine startup phase such that the gear assembly drives the gear to rotate the shaft of the bowed-rotor mitigation device and axially actuate the threaded collar along the helical threaded portion of the shaft.

5. The gas turbine engine according to claim 3, wherein an amount of the mechanical load released by the bowed-rotor mitigation drive device provides the driving force to the starter and to the accessory gearbox to rotate the compressor rotor shaft assembly less than one full revolution in each period.

6. The gas turbine engine according to claim 3, wherein the series of stacked spring structures comprises a plurality of springs and a plurality of baffle plates, the plurality of springs including a first spring, a second spring, and a third spring, the first spring and the second spring being separated from each other by a first baffle plate of the plurality of baffle plates, and the second spring and the third spring being separated from each other by a second baffle plate of the plurality of baffle plates.

7. The gas turbine engine according to claim 6, wherein the plurality of springs further includes a fourth spring, a fifth spring, and a sixth spring, the fourth spring and the fifth spring being separated from each other by the first baffle plate, and the fifth spring and the sixth spring being separated from each other by the second baffle plate.

8. The gas turbine engine according to claim 7, wherein each of the first spring, the second spring, the third spring, the fourth spring, the fifth spring, and the sixth spring are waveform springs that extend circumferentially about the shaft, the first spring and the fourth spring having different diametrical sizes from each other, the second spring and the fifth spring having different diametrical sizes from each other, and the third spring and the sixth spring having different diametrical sizes from each other.

9. The gas turbine engine according to claim 7, wherein each of the first spring, the second spring, the third spring, the fourth spring, and the fifth spring are helical compression springs.

10. The gas turbine engine according to claim 3, wherein a controller controls the clutch to periodically release the mechanical load retained in the bowed-rotor mitigation drive device.

* * * * *